US012758878B2

United States Patent

Dong et al.

(10) Patent No.: US 12,758,878 B2

(45) Date of Patent: Oct. 13, 2026

(54) PERSONALIZED LANGUAGE MODELS FOR CONVERSATIONAL AI SYSTEMS AND APPLICATIONS

(71) Applicant: NVIDIA Corporation, Santa Clara, CA (US)

(72) Inventors: Yi Dong, Lexington, MA (US); Xianchao Wu, Tokyo (JP)

(73) Assignee: NVIDIA Corporation, Santa Clara, CA (US)

( * ) Notice: Subject to any disclaimer, the term of this patent is extended or adjusted under 35 U.S.C. 154(b) by 239 days.

(21) Appl. No.: 18/351,900

(22) Filed: Jul. 13, 2023

(65) Prior Publication Data

US 2025/0018298 A1 Jan. 16, 2025

(51) Int. Cl.

| | |
|---|---|
| ***G06F 40/284*** | (2020.01) |
| ***A63F 13/67*** | (2014.01) |
| ***G06F 40/40*** | (2020.01) |
| ***G06N 20/00*** | (2019.01) |
| *G06F 40/35* | (2020.01) |

(52) U.S. Cl.

CPC ............ *A63F 13/67* (2014.09); *G06F 40/284* (2020.01); *G06F 40/40* (2020.01); *G06N 20/00* (2019.01); *G06F 40/35* (2020.01)

(58) Field of Classification Search

CPC ....... A63F 13/67; G06N 20/00; G06F 40/284; G06F 40/40; G06F 40/35

See application file for complete search history.

(56) References Cited

U.S. PATENT DOCUMENTS 10,977,551 B2 * 4/2021 Van Seijen ............ G06N 5/043

OTHER PUBLICATIONS

Chow, Y., et al, A Mixture-of-Expert Approach to RL-based Dialogue Management. Retrieved from Internet:<https://arxiv.org/abs/2206.00059> (Year: 2022).*

Gao, L., et al, Scaling Laws for Reward Model Overoptimization. Retrieved from Internet:<https://proceedings.mlr.press/v202/gao23h.html> (Year: 2022).*

Laroche, R., et al, Multi-Advisor Reinforcement Learning. Retrieved from Internet:<https://arxiv.org/abs/1704.00756> (Year: 2017).*

Rosin, G., et al, Temporal Attention for Language Models. Retrieved from Internet:<https://arxiv.org/abs/2202.02093> (Year: 2022).*

(Continued)

*Primary Examiner* — Miranda M Huang
*Assistant Examiner* — Bart I Rylander
(74) *Attorney, Agent, or Firm* — Lowenstein Sandler LLP

(57) ABSTRACT

Disclosed are systems and techniques for training personalized language models. The techniques include applying a plurality of first machine learning models to a first input prompt. Each of the plurality of first machine learning models generates a respective reward value of a first plurality of reward values. The techniques include applying a second machine learning model to the first plurality of reward values to obtain first reward value embeddings; applying a third machine learning model to the first reward value embeddings and the first input prompt to obtain a first output response; calculating a first loss based on a comparison between the first output response and the first input prompt; and causing the second machine learning model to be modified based on the first loss.

21 Claims, 7 Drawing Sheets

(56) References Cited

OTHER PUBLICATIONS

Stiennon, N., et al, Learning to summarize from human feedback. Retrieved from Internet:<https://proceedings.neurips.cc/paper/2020/hash/1f89885d556929e98d3ef9b86448f951-Abstract.html> (Year: 2020).*
Wiering, M., Model-Based Multi-Objective Reinforcement Learning. Retrieved from Internet:<https://ieeexplore.ieee.org/abstract/document/7010622> (Year: 2014).*
Ziegler, D.,et al, Fine-Tuning Language Models from Human Preferences. Retrieved from Internet:<https://arxiv.org/abs/1909.08593> (Year: 2020).*
Askell, et al., "A General Language Assistant as a Laboratory for Alignment," arXiv:2112.00861v3 [cs.CL] Dec. 9, 2021, 48 pages. https://doi.org/10.48550/arXiv.2112.00861.
OpenAI, "Introducing ChatGPT", Nov. 30, 2022, 12 pages. https://openai.com/blog/chatgpt#OpenAI.
Chen, et al, "Decision Transformer: Reinforcement Learning via Sequence Modeling," 35th Conference on Neural Information Processing Systems (NeurIPS 2021), 14 pages.
Christiano, et al., "Deep Reinforcement Learning from Human Preferences," 31st Conference on Neural Information Processing Systems (NIPS 2017), Long Beach, CA, USA, 9 pages.
Li and Liang, "Prefix-Tuning: Optimizing Continuous Prompts for Generation," arXiv:2101.00190v1 [cs.CL] Jan. 1, 2021, 15 pages. https://doi.org/10.48550/arXiv.2101.00190.
Liu, et al., "GPT Understands, Too," arXiv:2103.10385v1 [cs.CL] Mar. 18, 2021, 10 pages. https://doi.org/10.48550/arXiv.2103.10385.
Longpre, et al., "The Flan Collection: Designing Data and Methods for Effective Instruction Tuning," arXiv:2301.13688v2 [cs.AI] Feb. 14, 2023, 22 pages. https://doi.org/10.48550/arXiv.2301.13688.
Lopez-Persem, et al., "Four core properties of the human brain valuation system demonstrated in intracranial signals," Nature Neuroscience, vol. 23, May 2020, 664-675. https://doi.org/10.1038/s41593-020-0615-9.
Ouyang, et al., "Training language models to follow instructions with human feedback," arXiv:2203.02155v1 [cs.CL] Mar. 4, 2022, 68 pages. https://doi.org/10.48550/arXiv.2203.02155.
Shi, et al., "REPLUG: Retrieval-Augmented Black-Box Language Models," arXiv:2301.12652v2 [cs.CL] Feb. 1, 2023, 12 pages. https://doi.org/10.48550/arXiv.2301.12652.
Tiku and Oremus, "The right's new culture-war target: 'Woke AI'," The Washington Post, Feb. 24, 2023, 5 pages.
Von Oswald, et al., "Transformers learn in-context by gradient descent," arXiv:2212.07677v1 [cs.LG] Dec. 15, 2022, 22 pages. https://doi.org/10.48550/arXiv.2212.07677.

* cited by examiner

PERSONALIZED LANGUAGE MODELS FOR CONVERSATIONAL AI SYSTEMS AND APPLICATIONS

TECHNICAL FIELD

At least one embodiment pertains to a system for training a language model that can modify its responses based on a user's preferences.

BACKGROUND

Language models may include machine learning models that have been trained to predict an output—such as text, audio, etc. —based on processing a given input prompt. Some language models (e.g., large language models (LLMs)) are large in size (e.g., billions of parameters) and are trained using large amounts of data, which allow the model to appropriately respond to a large variety of input prompts. In some cases, the LLM is finetuned after training on the large amount of data to improve the accuracy of the LLM regarding one or more specific tasks.

DETAILED DESCRIPTION

Figure 1:
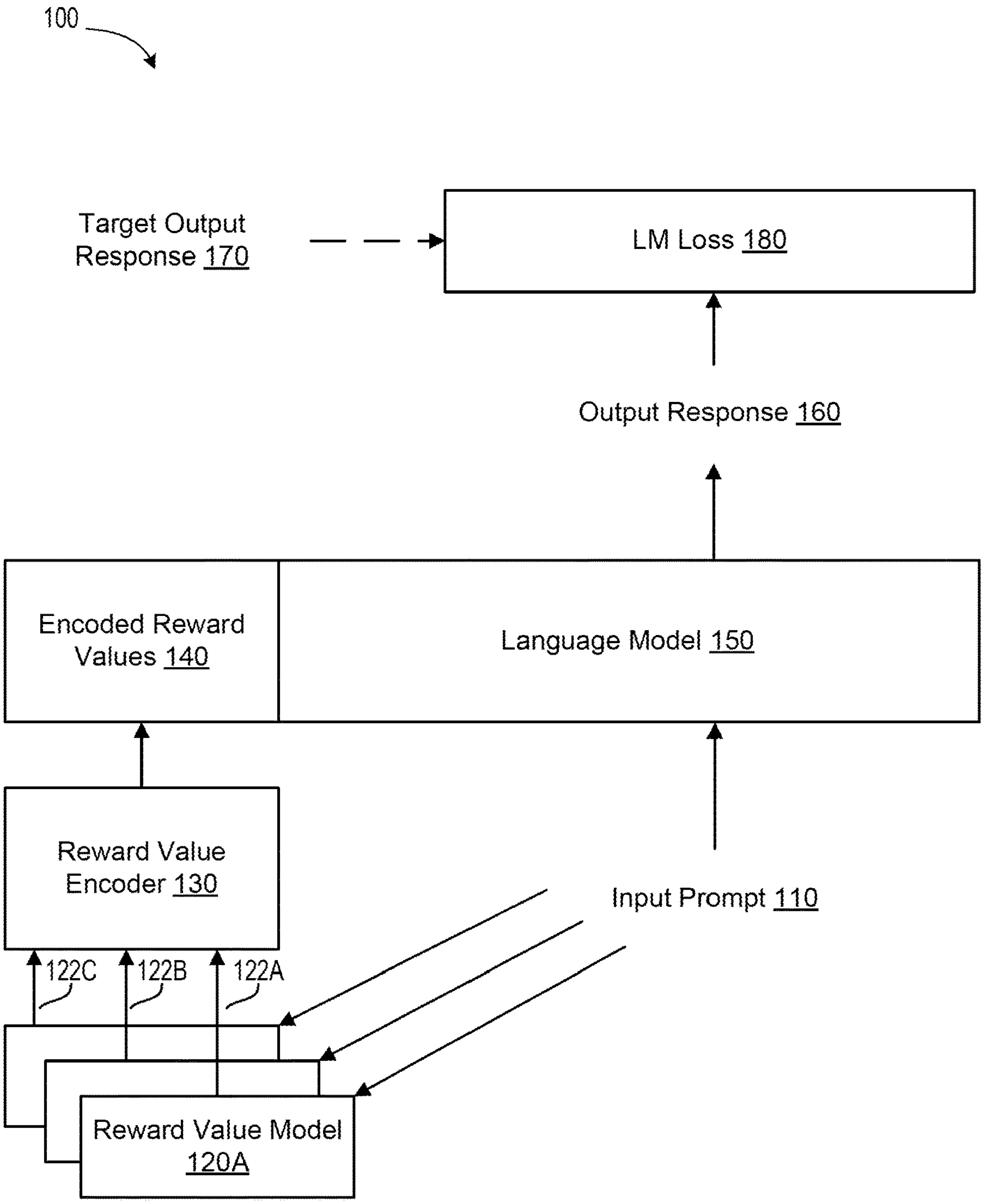
FIG. 1 illustrates an example data flow for training a personalized language model, according to at least one embodiment.

Some language models—such as LLMs—are finetuned using reinforcement learning with human feedback (RLHF). RLHF models human preferences by gathering data from a group of people (e.g., human feedback) and constructing a reward model from it. The LLM is then finetuned to fit this reward model through reinforcement learning. Once finetuned, the LLM adopts the learned human preference, enabling the LLM to generate text that conforms to human expectations. However, the process of aligning the LLM to the reward model reduces the LLM's diversity (often referred to as an "alignment tax"). Because the reward model is based on labelling LLM responses as either "good" or "bad," the LLM cannot be tailored to the diverse backgrounds and preferences of its users. Additionally, finetuning with reinforcement learning is a complex process that suffers from hyperparameter sensitivity and requires the collection of rollout data during training, resulting in a longer training process.

Aspects and embodiments of the present disclosure address these and other technological challenges by providing systems and techniques that tune a language model—such as a large language model (LLM) —using a plurality of reward models, each based on a different value, to create a personalized language model. Some reward models may be trained using human feedback to determine human preference values based on the language model output, such as helpfulness, truthfulness, harmfulness, age appropriateness, political polarity, etc. Some reward models may be trained based on metadata attributes of the language model output, such as length, sentence complexity, vocabulary diversity, etc. When training a reward model based on human feedback, a human may be presented, for example, with two or more outputs of the language model and may decide which of the outputs is preferred (e.g., more truthful, less harmful, more age appropriate, more or less humorous, etc.). When training a reward model based on metadata attributes of the language model output, an algorithm may be used to determine which of two outputs is shorter (less complex, uses more common vocabulary, etc.).

Each reward model may be based on a language model and may be configured to output a number indicating how strongly the output should match the value corresponding to the reward model. For example, a high value from the reward model that determines helpfulness may cause the language model to output a very helpful response, and a low value from the reward model that determines a length of the output may cause the language model to output a short response. The reward values (e.g., discrete values indicating how much a language model output should align with a particular value/attribute) from each reward model may be provided to a value encoder that converts the reward value from a discrete value to a vector value in the language model embedding space. In some embodiments, the vector embeddings of the reward values (e.g., collection of vector representations of each reward value) are prepended at the start of the language model's hidden outputs to cause the language model to output a response aligned with the reward values (e.g., prefix tuning). In some embodiments, the vector embeddings of the reward values are combined with the language model input as virtual token embeddings (e.g., p-tuning). For example, the text of the language model input may be converted into a sequence of vectors within an embedding space, and the vector representations of the reward values may be combined with (e.g., prepended to, appended to, concatenated with, etc.) the vector representations of the text of the language model input before being provided to the language model.

After the reward models have been trained, the value encoder may be pre-trained. In some embodiments, the language model is trained at the same time as the value encoder. In some embodiments, the language model weights are frozen, and the language model is trained before or after the value encoder. While training the value encoder and/or the language model, the weights of the reward models may be frozen. The value encoder may include a multi-layer perceptron (e.g., a fully-connected feedforward neural network) that converts the reward values into embedding vectors in the language model embedding space. During training of the value encoder, an input prompt may be provided to the trained reward models. The input prompt may include a sequence of text (e.g., from a user) used as input to a language model. The trained reward models may generate reward values, which can be provided to the value encoder. The value encoder may generate value embeddings that can be prepended to the language model to condition text generation. The input prompt can also be provided to the language model. Based on the output of the language model, the weights of the value encoder (and/or the language model) can be updated. The language model may be evaluated using an auto-regressive language model loss function.

After the pre-training, the value encoder may be fine-tuned. While the pre-training process may be unsupervised, the fine-tuning process maybe supervised. In some embodiments, the training dataset may include example (input prompt, response) pairs used for instruction tuning. For example, a training dataset that includes good and bad examples of (input prompt, response) pairs may be used to fine-tune the value encoder. In some embodiments, the training dataset may include example conversations used for chatbot tuning. The reward models may be used to generate reward values based on the training input prompt(s). The reward values may be provided to the value encoder, which can generate value embeddings that can be applied to the language model. The language model may generate an output based on the value embeddings and the input prompt. The output may be compared to the training response corresponding to the input prompt and weights of the value encoder may be updated. Similar to the pre-training process, weights of the language model may be frozen or may be updated during fine-tuning of the value encoder. In some embodiments, when the training dataset does not include sufficient examples, the training process can be augmented using the bootstrapping method.

After training the models, and during an inference stage, the outputs of the language model can be adjusted based on the values provided to the value encoder. In some embodiments, an input prompt is provided to the reward models to generate the reward values that are provided to the value encoder. In some embodiments, a user may be able to select individual reward values that are provided to the value encoder (e.g., using tuning knobs in a graphical user interface). In some embodiments, the reward values are constrained (e.g., before being provided to the value encoder) to prevent the language model from engaging in harmful behavior.

The trained models may be used in applications that would benefit from personalized language models, such as creating a personalized virtual assistant, customizing a virtual teacher based on student preferences, tailoring the responses of a virtual therapist based on client preferences, etc. The trained models may also be used in video games (or other generated worlds, such as virtual reality worlds) to customize the dialogue of non-player characters (NPCs). For example, NPCs could be generated within the video game that have unique personalities and dialogue based on the player's preferences. In some embodiments, the NPC's dialogue may be based on a player's past choices within the game.

The advantages of the disclosed techniques include but are not limited to training a single language model that can respond based on a variety of preferences, resulting in usage of fewer computing resources and storage space than the alternative, which would require a different trained model for each unique set of preferences. The single, personalized language model may also be more accurate, have more diverse outputs, and be less sensitive to hyperparameter tuning.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational artificial intelligence (AI), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems for generating or presenting at least one of augmented reality content, virtual reality content, or mixed reality content, systems incorporating one or more virtual machines (VMs), systems for performing synthetic data generation operations, systems implemented at least partially in a data center, systems for performing conversational AI operations, systems implementing one or more language models—such as large language models (LLMs), systems for performing light transport simulation, systems for performing collaborative content creation for 3D assets, systems implemented at least partially using cloud computing resources, and/or other types of systems.

System Architecture

FIG. 1 illustrates an example data flow 100 for training a personalized language model (such as a large language model (LLM)), according to at least one embodiment. The personalized language model may include one or more reward value models 120A-C, reward value encoder 130, and language model 150. In some embodiments, language model 150 may be a large language model (LLM) (e.g., a generative pre-trained Transformer model). Reward value encoder 130 may generate reward value embeddings 140 that condition language model 150 to generate responses in line with the reward values encoded in reward value embeddings 140. For example, individual reward value models (e.g., reward value model 120A, reward value model 120B, etc.) may be tuned based on specific preference values related to the responses generated by language model 150. For example, reward value model 120A may generate reward values that increase the likelihood that an output of language model 150 is considered helpful by a human. Other reward value models may generate reward values that affect the truthfulness, harmfulness, age appropriateness, political polarity, brevity, sentence complexity, and/or other attributes of the output of language model 150.

Based on input prompt 110, each reward value model 120A-C may generate a respective reward value 122A-C that may be provided to reward value encoder 130. Individual reward values 122A-C may be discrete values (e.g., integer values). Reward value encoder 130 may convert the discrete reward values 122A-C into vectors within an embedding space (e.g., reward value embeddings 140). In some embodiments, reward value embeddings 140 are prepended at the start of the hidden outputs of language model 150 to cause language model 150 to output a response aligned with the reward values (e.g., prefix tuning). In some embodiments, reward value embeddings 140 are combined with input prompt 110 as virtual token embeddings to influence the output of language model 150 (e.g., p-tuning).

Based on reward value embeddings 140, language model 150 may generate output response 160, which may be aligned with the reward values 122A-C included in reward value embeddings 140. In some embodiments, output response 160 may be a response to an instruction provided to language model 150 as input. The instruction input prompt may ask language model 150 to perform some task (e.g., natural language processing task, entity recognition, translation, etc.). In some embodiments, output response 160 may be a response to a dialogue/conversation provided to language model 150 as input (e.g., chatbot dialogue).

Training the personalized language model may be performed in multiple stages. In some embodiments, language model 150 is pre-trained first. Then, the one or more reward value models 120A-C may be trained, followed by training of reward value encoder 130. In some embodiments, training reward value encoder 130 may include pre-training and fine-tuning. In some embodiments, language model 150 is trained at the same time as reward value encoder 130 and/or reward value models 120A-C. In some embodiments, language model 150, reward value models 120A-C, and/or reward value encoder 130 are trained in a different order.

Individual reward value models (e.g., reward value model 120A) may be based on an LLM. For example, the last language model layer may be removed, and a new layer may be added to map the previous layer's output to the reward value (e.g., reward value 122A). During training, for at least one of the one or more reward value models 120A-C, a training input prompt may be provided to the reward value model (e.g., reward value model 120A). The reward value model may output a reward value (e.g., reward value 122A), which may be provided to reward value encoder 130. Reward value encoder 130 may generate reward value embeddings 140, which may be provided to language model 150 along with the training input prompt (e.g., input prompt 110). Two outputs may be generated by language model 150 and human feedback may be collected to determine which of the two outputs is more aligned with the attribute of the reward value model being trained. For example, when training a reward value model for helpfulness, human users may be asked to make a comparison between two outputs from language model 150 and decide which output response (e.g., language model response) is more helpful. A loss (e.g., an indication of an accuracy or precision of the model) may be calculated based on the human feedback, and the reward value model may be modified (e.g., weights may be modified) to minimize the loss. A second reward value model (e.g., reward value model 120B) may be trained to cause language model 150 to generate outputs that align with another value (e.g., truthfulness, harmfulness, age appropriateness, etc.).

In some embodiments, reward value models may be trained based on metadata attributes of the language model output, such as length, sentence structure complexity, vocabulary diversity, etc. When training a reward model based on metadata attributes of the language model output, an algorithm may be used to determine which of two outputs is shorter (less complex, uses more common vocabulary, etc.), or which of the two output is longer or more complex, depending on the individual goals for the particular language model. In some embodiments, human feedback is used instead of an algorithm to determine which of the two outputs is shorter (less complex, uses more common vocabulary, etc.). In some embodiments, some reward value models are trained using human feedback and others are trained using algorithmic determinations.

In some embodiments, during pre-training of reward value encoder 130, weights of language model 150 may be frozen. In some embodiments, language model 150 and reward value encoder 130 are pre-trained at the same time. For example, reward value encoder may be pre-trained using a large text corpus as training data while language model 150 is being trained with the same corpus. In some embodiments, reward value encoder 130 includes a multi-layer perceptron, which includes various weights, that converts discrete reward values (e.g., reward values 122A-C) to vectors within an embedding space.

During pre-training, weights of reward value models 120A-C may be frozen, and reward value models 120A-C may be applied to the input text to obtain respective reward values. Reward value encoder 130 may be applied to the reward values to obtain reward value embeddings 140. In some embodiments, reward value embeddings may be prepended to language model 150 to condition the text generation. Language model 150 may be trained using an auto-regressive language model loss function (e.g., LM loss 180). Based on the calculated loss, weights of reward value encoder 130 may be modified to minimize the loss of language model 150. As the loss is minimized, language model 150 may learn to generate text aligned with the embedded reward values of reward value embeddings 140.

During fine-tuning, task-specific datasets may be used to train reward value encoder 130 and/or language model 150. In some embodiments, a training dataset includes instruction data and/or chatbot dialogue data. Instruction data may include prompts and corresponding responses for natural language processing tasks. Chatbot dialogue data may include conversation dialogues and corresponding responses based on the dialogue context. The dataset may include both good and bad responses. For example, the dataset may include good instruction responses, bad instruction responses, good dialogue responses, and/or bad dialogue responses. Each response may include a corresponding training input prompt (e.g., training input instruction prompt, training input dialogue prompt). The training input prompt (e.g., input prompt 110) may be provided to reward value models 120A-C to obtain reward values 122A-C, which are converted to reward value embeddings 140 by reward value encoder 130. Language model 150 may generate output response 160 based on the input prompt and the reward value embeddings. A loss of language model 150 and/or reward value encoder 130 may be calculated (e.g., LM loss 180) based on a comparison of output response 160 and the training target output (e.g., target output response 170) corresponding to the training input prompt. Weights of reward value encoder 130 and/or language model 150 may be modified to minimize the loss. In some embodiments, if the fine-tuning training dataset is not very large, the data bootstrap method can be used to further fine-tune the model. For example, the prompt can be fed to the reward value models to get value scores. Then, using the scores and the prompt as input, language model 150 may be sampled multiple times, and a new fine-tuning dataset may be generated using the same prompt. This may be repeated multiple times until language model 150 is aligned with the reward value models.

After training, the personalized language model may be used to generate personalized responses that align with values of a user/task/program/application/implementation/etc. For example, a user may be able to request responses that maximize helpfulness while minimizing sentence length. To prevent the personalized language model from engaging in harmful behaviors, minimum value constraints for each of the reward values may be established. As another example, the personalized language model may be used in a grade level context, where shorter, less complex responses are favored, so the personalized language model may tuned to output shorter, less complex responses, and longer, more complex responses may be penalized.

Figure 2:
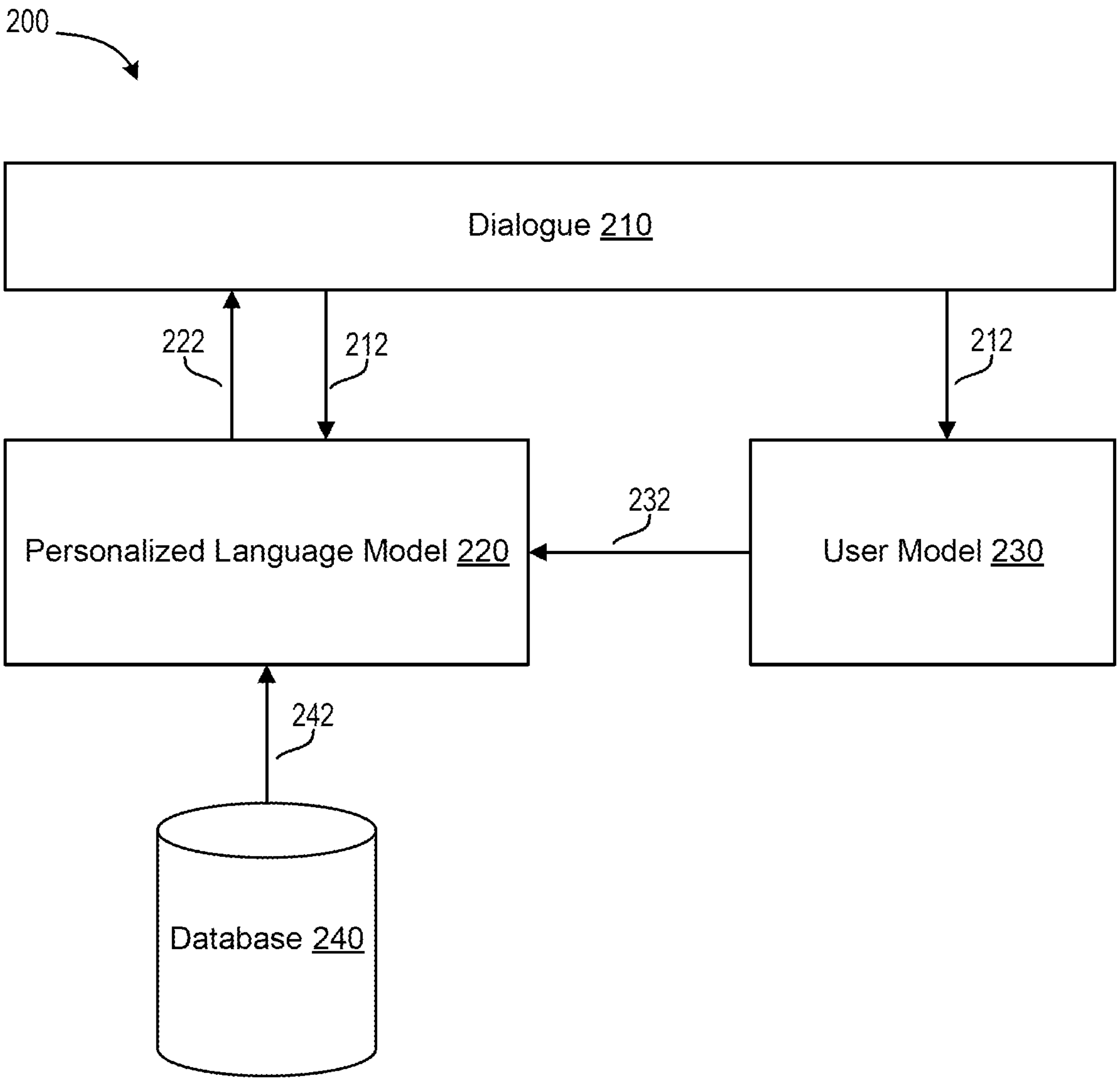
FIG. 2 illustrates an example usage of a personalized language model for personalized dialogue, according to at least one embodiment.

FIG. 2 illustrates an example usage 200 of a personalized language model 220 for personalized dialogue, according to at least one embodiment. In some embodiments, personalized language model 220 may be used to provide customized virtual assistant (digital assistant) experiences based on preferences of the user (e.g., personalized based at least on personality traits previously displayed by the user), customized virtual teacher experiences based on preferences of the student, customized virtual therapist responses based on client preferences, and/or the like. For example, dialogue 210 may include a conversation history between a user and personalized language model 220. A user may generate a prompt 212 (e.g., a question, a statement, an instruction, etc.) that may be provided, as an input prompt, to personalized language model 220. Prompt 212 may also be provided to user model 230, also referred to as user traits model or user-tuned model, herein. The term "user-tuned" may include instances where the model(s) are tuned at the direction of and/or in view of a user and/or a user's preferences, and/or instances where the models are tuned using any type of user responses and/or feedback requested and/or orchestrated by a computer application, e.g., a digital assistant, a gaming application, and/or the like. Output 232 of user model 230 may be provided to personalized language model 220 along with prompt 212. In some embodiments, user model 230 includes a plurality of reward value models (e.g., reward value models 120A-C of FIG. 1) and outputs discrete reward values, also referred to as personality value herein. Individual personality values may characterize respective personality traits previously displayed by the user. In some embodiments, user model 230 includes a plurality of reward value models (user traits models) and a value encoder (e.g., reward value encoder 130 of FIG. 1) and outputs reward value embeddings (token embeddings), e.g., using an embeddings algorithm recognized by the language model. Based on prompt 212 and output 232, personalized language model 220 may generate a personalized response 222, which may be provided to the user and included in dialogue 210. In some embodiments, personalized language model 220 may include in personalized response 222 information from database 240, e.g., one or more database entries associated with the user. For example, in a virtual or digital assistant scenario, database 240 may include calendar event information, contact information, document information, or the like. The information may be included in response 222 based on the user's preferences. The information may be included in response 222 using black-box retrieval augmented language model methods.

To train user model 230, the user may interact with personalized language model 220 to establish some conversation history (e.g., dialogue 210). More specifically, user model 230 may receive one or more training input prompts generated by the user. The user may be provided with two or more response options and may pick the response the user prefers. In some implementations, reward values may then be received from the user, with different reward values associated with different individual responses generated by user model 230. Based on the selection, one or more parameters of user model 230 may be modified using the reward values to align with the user's preferences. In some embodiments, a neural network is used to map dialogue 210 to the user's preferences. In some embodiments, a user may explicitly provide reward values for the different values (e.g., helpfulness, truthfulness, harmfulness, etc.) on which personalized language model 220 is trained. For example, the reward values may evaluate helpfulness of a response, truthfulness of the response, potential harmfulness of the response, age appropriateness of the response, conciseness of the response, and/or any other suitable evaluation categories. In some embodiments, a user interface includes input elements (e.g., knobs, sliders, text fields, etc.) that allow a user to specify the discrete reward value that should be used for a given value.

Figure 3:
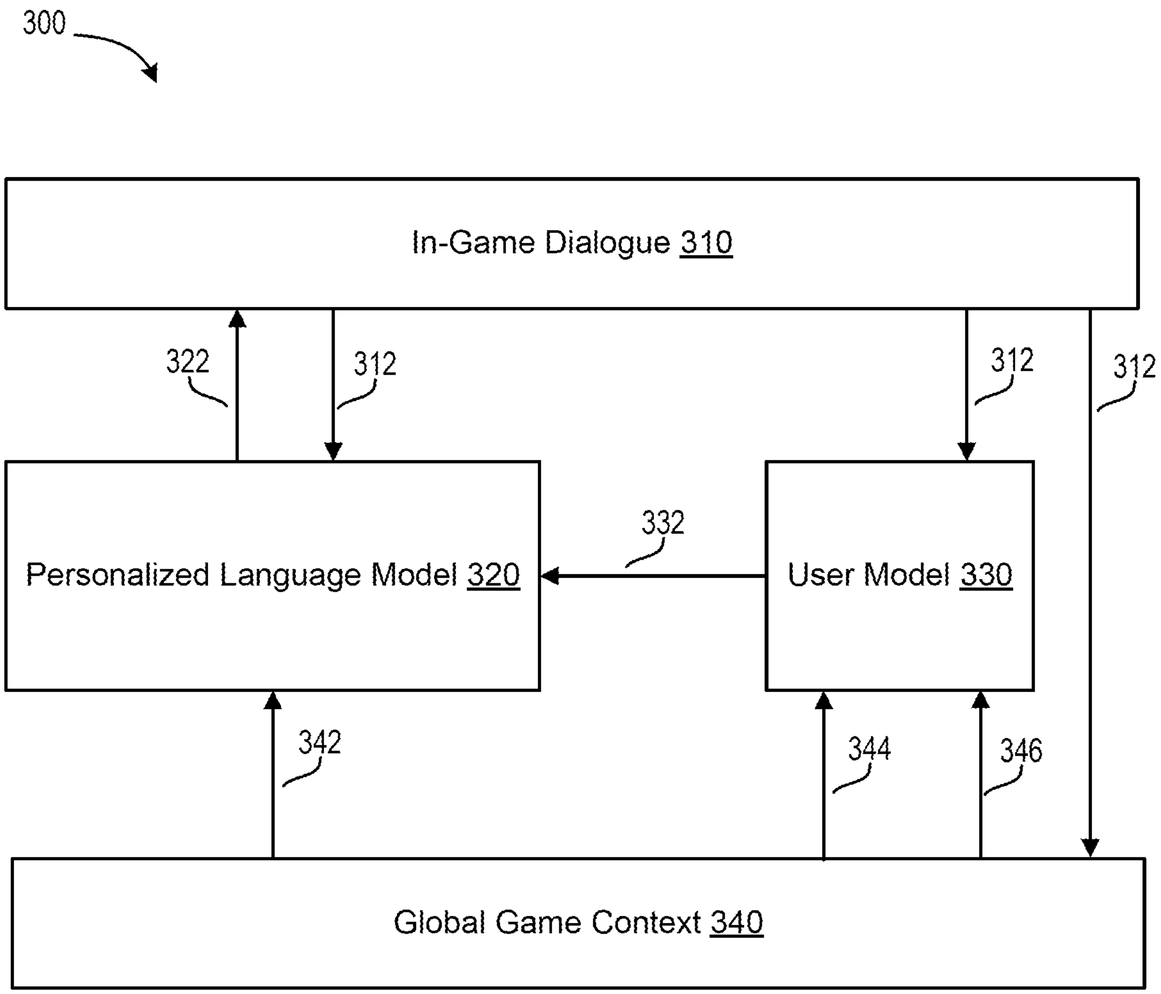
FIG. 3 illustrates an example usage of a personalized language model within video games, according to at least one embodiment.

FIG. 3 illustrates an example usage 300 of a personalized language model 320 within video games, according to at least one embodiment. Within a video game, the interactions between the player and the game characters may be critical to creating a realistic and immersive experience. Personalized language models (e.g., personalized language model 220) may be used to develop game characters that have unique personalities and dialogue based on the player's preferences. For example, in open-world games, personalized language models may be used to customize non-player characters (NPCs) based on the NPC's original role design, a player's past choices, and/or a player's preferences.

Referring to FIG. 3, global game context 340 may include a large language model that is trained to generate game plots and spawn NPC roles based on the player's past dialogue and activities during gameplay. When global game context 340 decides to spawn a new NPC for the player to interact with, global game context 340 may send NPC role information 346 (NPC profile) to user model 330 (user traits model), along with the player's past activity information 344, e.g., record of previous interactions of the user with the gaming application. User model 330 may generate a set of reward values 332 (personality values for the NPC) that reflect the player's preferences based on NPC role information 346, past activity information 344, and current dialogue context 312 (e.g., an input communication from the user to the NPC) from in-game dialogue 310. In some implementations, individual reward values (personality values) may characterize the user's preferences towards respective NPC personality traits displayed by the user in previous interactions with one or more NPCs of the gaming application. The NPC personality traits may include one or more of fairness, loyalty, safety, adventurousness, honesty, humor, knowledge, helpfulness, and/or any other suitable traits. Reward values 332 may be provided to personalized language model 320, along with current dialogue context 312, and/or game plot 342 to condition personalized language model 320 to generate output response 322 based on the user's preferences. In some implementations, prior to applying personalized language model 320, the one or more personality values for the NPC may be represented via token embeddings using an embeddings algorithm recognized by personalized language model 320.

Personalized language model 320 may generate a communication from the NPC to the user. The communication may be (or include) text, sound, gesture, graphics, animation, emoji, or any other carrier of information. The generated communication may then be provided (e.g., via a user interface), to the user.

In some embodiments, global game context 340 may create an open world dynamically depending on the user's past behavior, which may result in the creation of numerous unique game characters during gameplay, each with a distinct set of values that align with their personalities. For example, a character with a strong sense of justice may have high values related to fairness, while a character who values loyalty may have high values related to loyalty. Each NPC may have a corresponding personalized language model that generates dialogue responses that align with their values and the current game plot 342, allowing for a more immersive and personalized gaming experience.

In some embodiments, personalized language models may be used for value-based decision-making for the game characters. For example, a character who highly values safety may make a different decision than a character who highly values adventure, even if presented with the same options.

Figure 4:
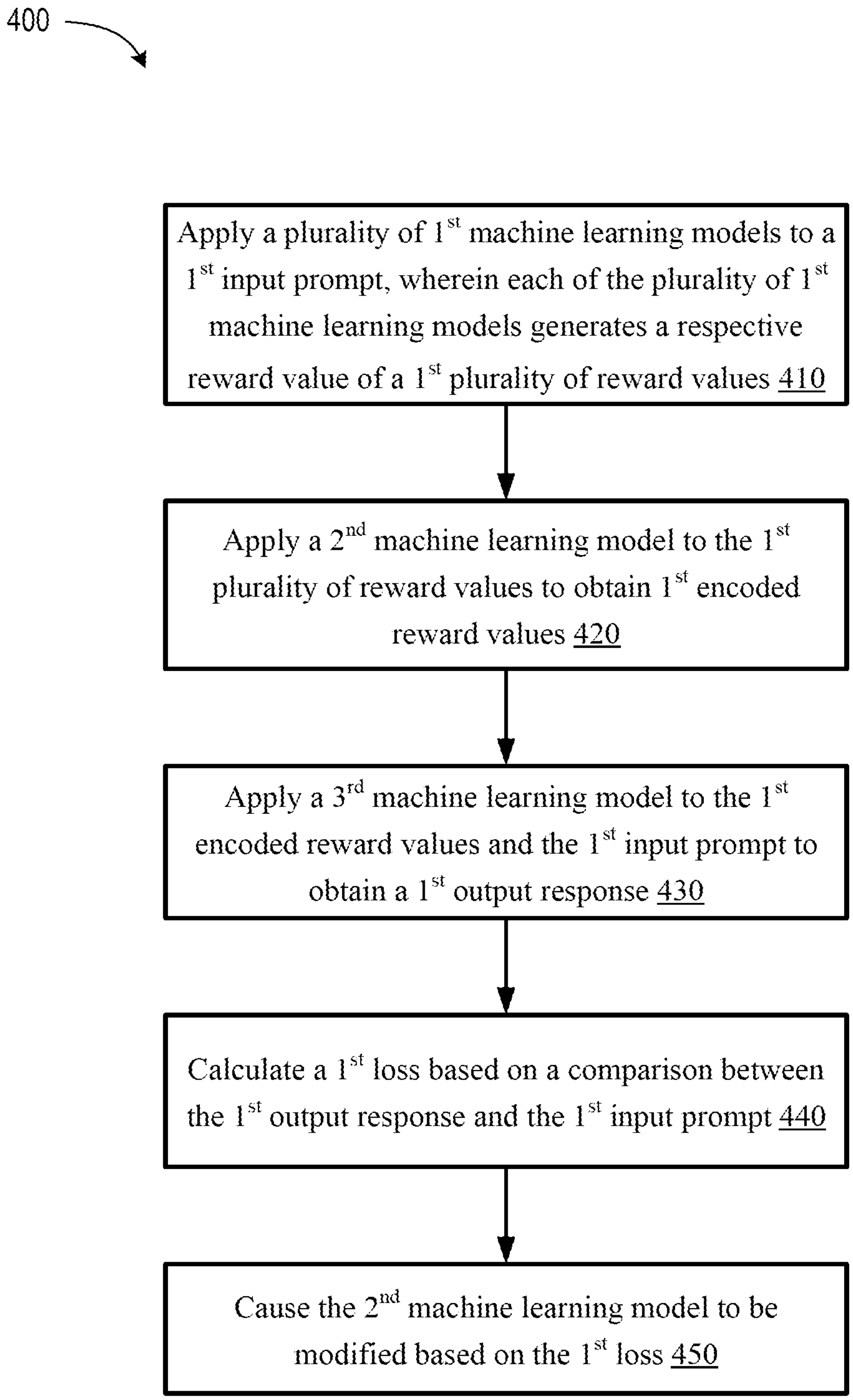
FIGS. 4-6 are flow diagrams of example methods of training a personalized language model, according to at least one embodiment.
Figure 5:
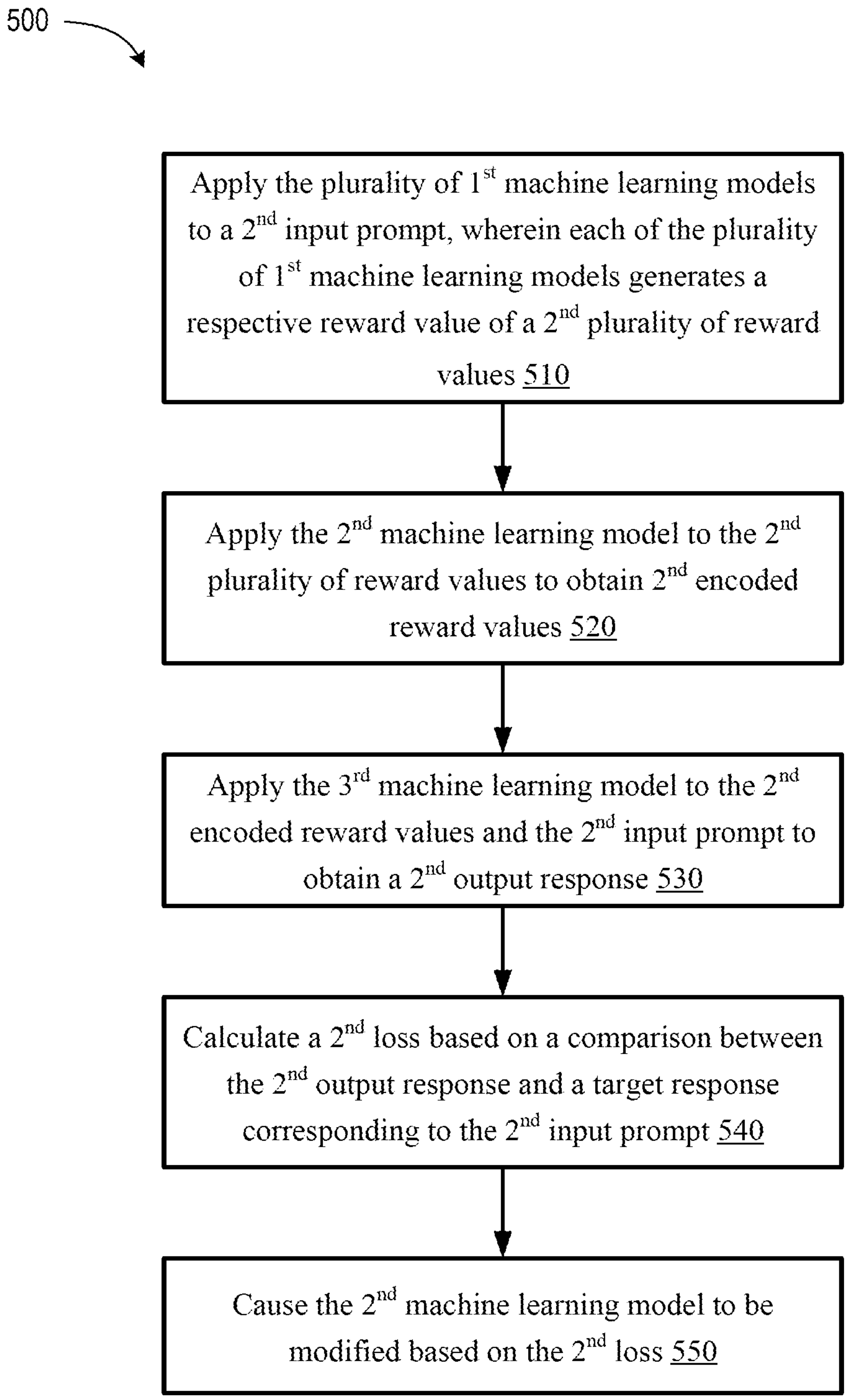
Figure 6:
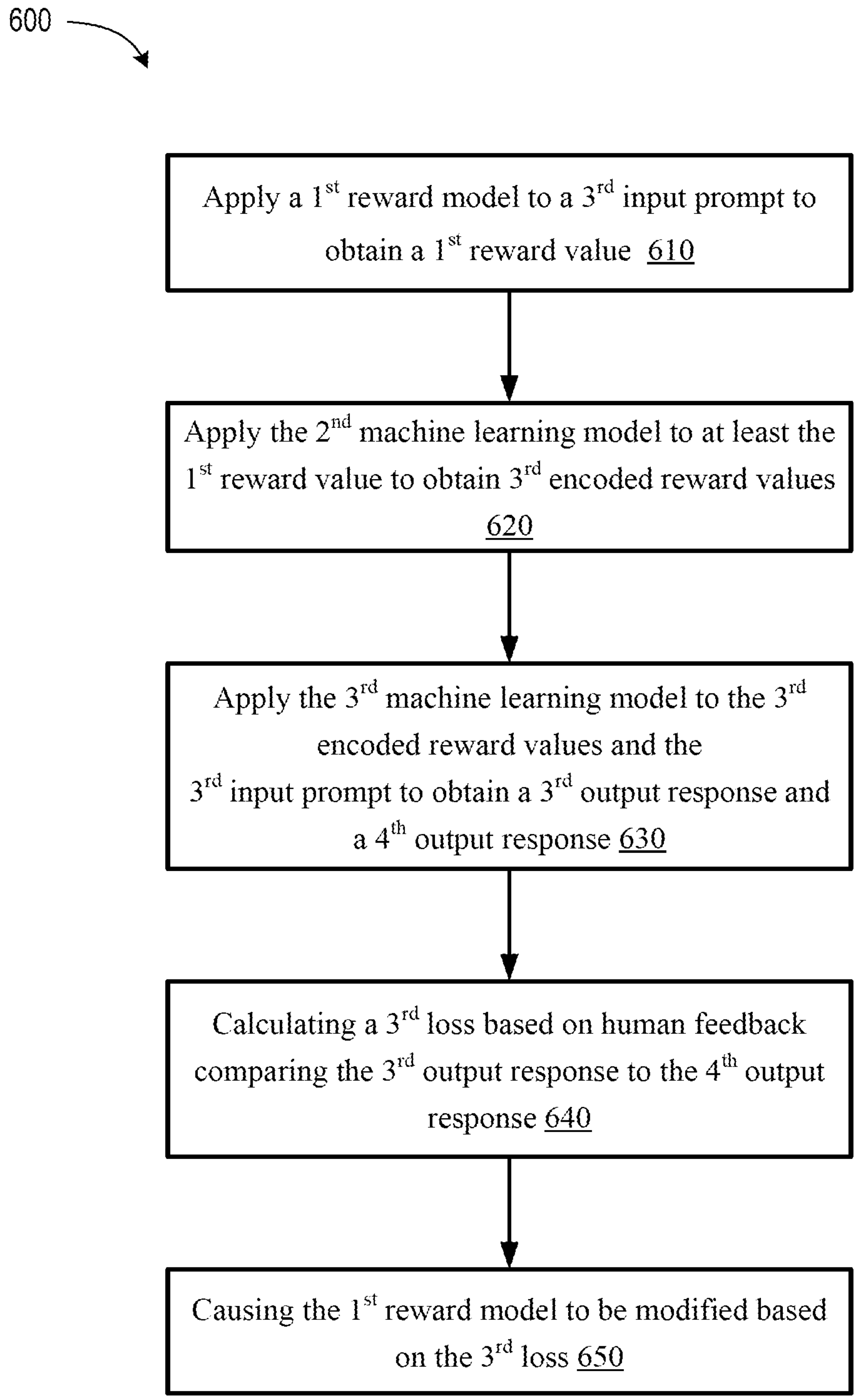

FIGS. 4-6 are flow diagrams of example methods 400, 500, and 600 of training a personalized language model, at least according to one embodiment. Methods 400, 500, and 600 may be performed using one or more processing units (e.g., central processing units (CPUs), graphic processing units (GPUs), accelerators, physic processing units (PPUs), data processing units (DPUs), etc.), which may include (or communicate with) one or more memory devices. In at least one embodiment, methods 400, 500, and 600 may be performed by example computing device 700. In at least one embodiment, processing units performing any of methods 400, 500, and 600 may be executing instructions stored on a non-transitory computer-readable storage media. In at least one embodiment, any of methods 400, 500, and 600 may be performed using multiple processor threads (e.g., CPU threads and/or GPU threads), individual threads executing one or more individual functions, routines, subroutines, or operations of the method. In at least one embodiment, processing threads implementing any of methods 400, 500, and 600 may be synchronized (e.g., using semaphores, critical sections, and/or other thread synchronization mechanisms). Alternatively, processing threads implementing any of methods 400, 500, and 600 may be executed asynchronously with respect to each other. Various operations of methods 400, 500, and 600 may be performed in a different order compared with the order shown in FIGS. 4-6. Some operations of methods 400, 500, and 600 may be performed concurrently with other operations. In at least one embodiment, one or more operations shown in FIGS. 4-6 may not always be performed.

FIG. 4 is a flow diagram of an example method 400 of training personalized language model, according to at least one embodiment. At block 410, one or more processing devices performing method 400 may apply a plurality of first machine learning models to a first input prompt. Each of the plurality of first machine learning models may generate a respective reward value of a first plurality of reward values. At block 420, the one or more processing devices may apply a second machine learning model to the first plurality of reward values to obtain first reward value embeddings.

At block 430, the one or more processing devices may apply a third machine learning model to the first reward value embeddings and the first input prompt to obtain a first output response. In some embodiments, applying the third machine learning model to the first reward value embeddings and the first input prompt may include prepending the first reward value embeddings to a first hidden layer of the third machine learning model. In some embodiments, applying the third machine learning model to the first reward value embeddings and the first input prompt may include prepending the reward value embeddings to the first input prompt as virtual token embeddings.

At block 440, the one or more processing devices may calculate a first loss based on a comparison between the first output response and the first input prompt. At block 450, the one or more processing devices may cause the second machine learning model to be modified based on the first loss. In some embodiments, the plurality of first machine learning models includes a language model. In some embodiments, the second machine learning model includes a multi-layered perceptron. In some embodiments, the third machine learning model includes a language model.

FIG. 5 is a flow diagram of an example method 500 of training a personalized language model, according to at least one embodiment. In some embodiments, method 500 may be performed after method 400. At block 510, one or more processing devices performing method 500 may apply the plurality of first machine learning models to a second input prompt. Each of the plurality of first machine learning models may generate a respective reward value of a second plurality of reward values. At block 520, the one or more processing devices may apply the second machine learning model to the second plurality of reward values to obtain second reward value embeddings. At block 530, the one or more processing devices may apply the third machine learning model to the second reward value embeddings and the second input prompt to obtain a second output response.

At block 540, the one or more processing devices may calculate a second loss based on a comparison between the second output response and a target response corresponding to the second input prompt. In some embodiments, the target response includes at least one of a good instruction response, a bad instruction response, a good dialogue response, or a bad dialogue response. At block 550, the one or more processing devices may cause the second machine learning model to be modified based on the second loss.

FIG. 6 is a flow diagram of an example method 600 of training a personalized language model, according to at least one embodiment. In some embodiments, method 600 may be performed after method 500. At block 610, one or more processing devices performing method 600 may, for at least a first reward model of the plurality of first machine learning models, apply the first reward model to a third input prompt to obtain a first reward value. At block 620, the one or more processing devices may apply the second machine learning model to at least the first reward value to obtain third reward value embeddings. At block 630, the one or more processing devices may apply the third machine learning model to the third reward value embeddings and the third input prompt to obtain a third output response and a fourth output response.

At block 640, the one or more processing devices may calculate a third loss based on human feedback comparing the third output response to the fourth output response. At block 650, the one or more processing devices may cause the first reward model to be modified based on the third loss.

Figure 7:
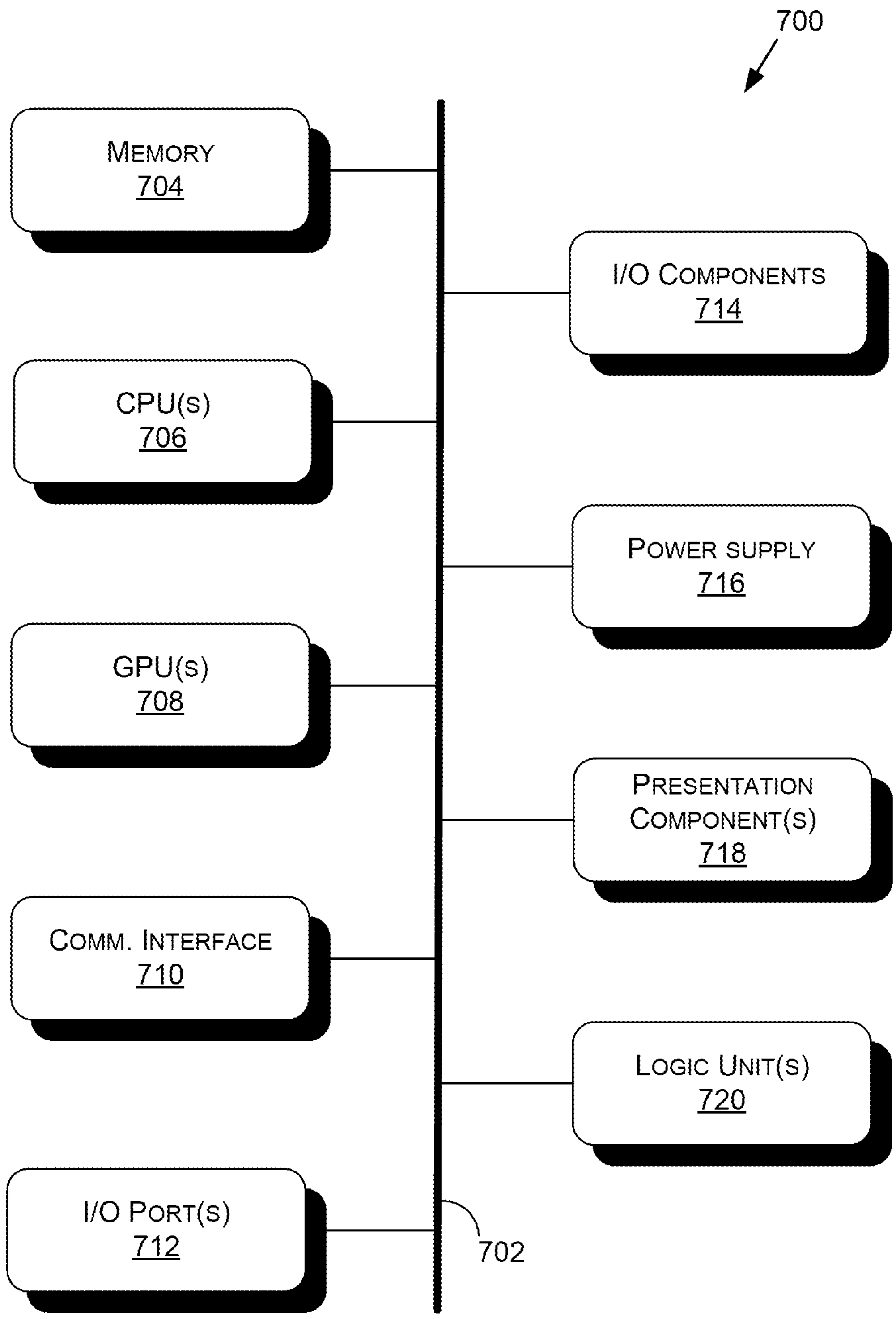
FIG. 7 is a block diagram of an example computing device suitable for training and/or deploying a personalized language model, in accordance with at least some embodiments.

FIG. 7 is a block diagram of an example computing device(s) 700 suitable for training and/or deploying a personalized language model, in accordance with at least some embodiments. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s)), such as an operating system. In accordance with one or more aspects of the present disclosure, the computer-readable instructions can comprise executable instructions for executing method 400, method 500, and/or method 600 of training a personalized language model. Computer-storage media may include, but is not limited to, random-access memory (RAM), read-only memory (ROM), electronically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, radio frequency (RF), infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. For example, in accordance with one or more aspects of the present disclosure, the CPU(s) 706 may be configured to execute instructions executing methods 400-600 of training a personalized language model. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

applying a plurality of first machine learning models to a first input prompt, wherein individual first machine learning models of the plurality of first machine learning models comprise a layer that generates a respective reward value of a first plurality of reward values for a respective attribute of a plurality of attributes;

applying a second machine learning model to the first plurality of reward values to obtain first encoded reward values comprising vector embeddings, wherein the first encoded reward values are combined with an input of a language machine learning model to condition the language machine learning model to generate a first output response aligned with the plurality of attributes;

applying the language machine learning model to the first encoded reward values and the first input prompt to obtain the first output response;

calculating a first loss based at least on a comparison between the first output response and the first input prompt; and updating one or more parameters of the second machine learning model based at least on the first loss.

2. The method of claim 1, further comprising:

applying the plurality of first machine learning models to a second input prompt, wherein individual first machine learning models of the plurality of first machine learning models generate a respective reward value of a second plurality of reward values;

applying the second machine learning model to the second plurality of reward values to obtain second encoded reward values;

applying the language machine learning model to the second encoded reward values and the second input prompt to obtain a second output response;

calculating a second loss based on a comparison between the second output response and a target response corresponding to the second input prompt; and updating the one or more parameters of the second machine learning model based at least on the second loss.

3. The method of claim 2, wherein the target response comprises at least one of:

a good instruction response;

a bad instruction response;

a good dialogue response; or a bad dialogue response.

4. The method of claim 1, further comprising, for at least an individual first machine learning model of the plurality of first machine learning models:

applying the individual first machine learning model of the plurality of first machine learning models to a third input prompt to obtain a first reward value;

applying the second machine learning model to at least the first reward value to obtain third encoded reward values;

applying the language machine learning model to the third encoded reward values and the third input prompt to obtain a third output response and a fourth output response;

calculating a third loss based on human feedback comparing the third output response and the fourth output response; and causing the individual first machine learning model of the plurality of first machine learning models to be modified based on the third loss.

5. The method of claim 1, wherein the first encoded reward values are combined with the input of the language machine learning model by prepending the first encoded reward values to a hidden layer of the language machine learning model.

6. The method of claim 1, wherein the first encoded reward values are combined with the input of the language machine learning model by prepending the first encoded reward values to the first input prompt as virtual token embeddings.

7. The method of claim 1, wherein:

at least a first machine learning model of the plurality of first machine learning models is a first language model; and the second machine learning model is a multi-layered perceptron.

8. The method of claim 1, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of augmented reality content, virtual reality content, or mixed reality content;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

9. The method of claim 1, wherein the vector embeddings of the first encoded reward values influence the language machine learning model to generate the first output response aligned with the plurality of attributes.

10. A system comprising:

one or more processing units to perform operations comprising:

applying a plurality of first machine learning models to a first input prompt, wherein individual first machine learning models of the plurality of first machine learning models comprise a layer that generates a respective reward value of a first plurality of reward values for a respective attribute of a plurality of attributes;

applying a second machine learning model to the first plurality of reward values to obtain first encoded reward values comprising vector embeddings, wherein the first encoded reward values are combined with an input of a language machine learning model to condition the language machine learning model to generate a first output response aligned with the plurality of attributes;

applying the language machine learning model to the first encoded reward values and the first input prompt to obtain the first output response;

calculating a first loss based at least on a comparison between the first output response and the first input prompt; and updating one or more parameters of the second machine learning model based at least on the first loss.

11. The system of claim 10, the operations further comprising:

applying the plurality of first machine learning models to a second input prompt, wherein individual first machine learning models of the plurality of first machine learning models generate a respective reward value of a second plurality of reward values;

applying the second machine learning model to the second plurality of reward values to obtain second encoded reward values;

applying the language machine learning model to the second encoded reward values and the second input prompt to obtain a second output response;

calculating a second loss based on a comparison between the second output response and a target response corresponding to the second input prompt; and updating the one or more parameters of the second machine learning model based at least on the second loss.

12. The system of claim 11, wherein the target response comprises at least one of:

a good instruction response;

a bad instruction response;

a good dialogue response; or a bad dialogue response.

13. The system of claim 10, the operations further comprising, for at least an individual first reward learning model of the plurality of first machine learning models:

applying the individual first machine learning model of the plurality of first machine learning models to a third input prompt to obtain a first reward value;

applying the second machine learning model to at least the first reward value to obtain third encoded reward values;

applying the language machine learning model to the third encoded reward values and the third input prompt to obtain a third output response and a fourth output response;

calculating a third loss based on human feedback comparing the third output response and the fourth output response; and causing the individual first machine learning model of the plurality of first machine learning models to be modified based on the third loss.

14. The system of claim 10, wherein the first encoded reward values are combined with the input of the language machine learning model by prepending the first encoded reward values to a hidden layer of the language machine learning model.

15. The system of claim 10, wherein the first encoded reward values are combined with the input of the language machine learning model by prepending the first encoded reward values to the first input prompt as virtual token embeddings.

16. The system of claim 10, wherein the first encoded reward values are combined with the input of the language machine learning model by prepending the first encoded reward values to the first input prompt as an encoded reward string.

17. The system of claim 10, wherein:

at least a first machine learning model of the plurality of first machine learning models is a first language model; and the second machine learning model is a multi-layered perceptron.

18. A non-transitory computer-readable storage medium storing instructions that, when executed by a processing device, cause the processing device to:

apply a plurality of first machine learning models to a first input prompt, wherein individual first machine learning models of the plurality of first machine learning models comprise a layer that generates a respective reward value of a first plurality of reward values for a respective attribute of a plurality of attributes;

apply a second machine learning model to the first plurality of reward values to obtain first encoded reward values comprising vector embeddings, wherein the first encoded reward values are combined with an input of a language machine learning model to condition the language machine learning model to generate a first output response aligned with the plurality of attributes;

apply the language machine learning model to the first encoded reward values and the first input prompt to obtain the first output response;

calculate a first loss based at least on a comparison between the first output response and the first input prompt; and update one or more parameters of the second machine learning model based at least on the first loss.

19. The non-transitory computer-readable storage medium of claim 18, wherein the instructions further cause the processing device to:

apply the plurality of first machine learning models to a second input prompt, wherein individual first machine learning models of the plurality of first machine learning models generate a respective reward value of a second plurality of reward values;

apply the second machine learning model to the second plurality of reward values to obtain second encoded reward values;

apply the language machine learning model to the second encoded reward values and the second input prompt to obtain a second output response;

calculate a second loss based on a comparison between the second output response and a target response corresponding to the second input prompt; and update the one or more parameters of the second machine learning model based at least on the second loss.

20. The non-transitory computer-readable storage medium of claim 18, wherein the instructions further cause the processing device to, for at least an individual first machine learning model of the plurality of first machine learning models:

apply the individual first machine learning model of the plurality of first machine learning models to a third input prompt to obtain a first reward value;

apply the second machine learning model to at least the first reward value to obtain third encoded reward values;

apply the language machine learning model to the third encoded reward values and the third input prompt to obtain a third output response and a fourth output response;

calculate a third loss based on human feedback comparing the third output response and the fourth output response; and cause the individual first machine learning model of the plurality of first machine learning models to be modified based on the third loss.

21. The non-transitory computer-readable storage medium of claim 18, wherein the first encoded reward values are combined with the input of the language machine learning model by prepending the first encoded reward values to a hidden layer of the language machine learning model.

* * * * *